(12) United States Patent
Laumen et al.

(10) Patent No.: US 7,890,139 B2
(45) Date of Patent: Feb. 15, 2011

(54) METHOD FOR PROVIDING PAYING SERVICES, USER IDENTIFICATION DEVICE, AND DEVICE FOR PROVIDING SAID SERVICES

(75) Inventors: Josef Laumen, Hildesheim (DE);
Andreas Schmidt, Braunschweig (DE);
Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/529,031

(22) PCT Filed: Sep. 24, 2003

(86) PCT No.: PCT/EP03/10638

§ 371 (c)(1),
(2), (4) Date: Oct. 24, 2005

(87) PCT Pub. No.: WO2004/030405

PCT Pub. Date: Apr. 8, 2004

(65) Prior Publication Data

US 2006/0135117 A1      Jun. 22, 2006

(30) Foreign Application Priority Data

Sep. 25, 2002   (DE) ................................ 102 44 611

(51) Int. Cl.
*H04M 1/38* (2006.01)
(52) U.S. Cl. ...................... 455/558; 455/406; 455/407; 455/405; 455/408; 455/409
(58) Field of Classification Search ......... 455/405–409, 455/418, 404.1, 404.2, 466, 414.1, 414.3, 455/557, 558, 435.1, 435.2; 705/64, 67, 705/68
See application file for complete search history.

(56) References Cited

U.S. PATENT DOCUMENTS 5,815,561 A * 9/1998 Nguyen et al. ......... 379/115.01

(Continued)

FOREIGN PATENT DOCUMENTS

DE       100 33 376         1/2002

(Continued)

OTHER PUBLICATIONS

XP-002278728—Gemplus, Telefonoca, Vodafone Goup: "Storage of configuration information in the USIM or SIM", Jul. 8-12, 2002, pp. 1-5.

*Primary Examiner*—Jinsong Hu
*Assistant Examiner*—Michael Nguyen
(74) *Attorney, Agent, or Firm*—King & Spalding L.L.P.

(57) ABSTRACT

A method is provided for providing paying services in a radio communication network which operates, in particular, according to the GSM Standard "Global System Mobile" or the UMTS Standard "Universal Mobile Telecommunications System"," via at least one radio communication terminal having a device for user identification, especially a "Subscriber Identity Module" or a "UMTS Subscriber Identity Module" (U)SIM, and at least one device for providing the services. According to the present invention, when a request for a service is made by the radio communication terminal to the device for providing the services, at least one message generated by the user identification device is transmitted. The present invention also relates to a network control unit for carrying out such method, the unit including at least parts for generating a request message aimed at a device for providing a paying service, and to a device for providing the services, the device including parts for evaluating at least one message generated by the user identification device during the request for a service made by the radio communication terminal, in addition to parts for initiating the service, and parts for providing the service.

16 Claims, 1 Drawing Sheet

U.S. PATENT DOCUMENTS

| | | | |
|---|---|---|---|
| 6,416,414 B1 | 7/2002 | Stadelmann | 463/42 |
| 6,728,553 B1 * | 4/2004 | Lehmus et al. | 455/558 |
| 6,907,239 B1 * | 6/2005 | Sivula | 455/406 |
| 6,976,011 B1 * | 12/2005 | Capitant et al. | 705/67 |
| 6,993,320 B1 * | 1/2006 | Brune et al. | 455/406 |
| 7,155,417 B1 * | 12/2006 | Sagar et al. | 705/68 |
| 7,317,697 B2 * | 1/2008 | Lewis et al. | 370/312 |
| 2002/0035539 A1 | 3/2002 | O'Connell | |
| 2002/0137545 A1 * | 9/2002 | Nachef | 455/558 |
| 2002/0167909 A1 * | 11/2002 | Balazinski et al. | 370/252 |

FOREIGN PATENT DOCUMENTS

| | | |
|---|---|---|
| EP | 1 083 767 | 3/2001 |
| GB | 2 372 405 | 8/2002 |
| WO | WO9833343 * | 7/1998 |
| WO | WO 00/04701 | 1/2000 |
| WO | WO 00/48146 | 8/2000 |
| WO | WO 01/22761 | 3/2001 |
| WO | WO 01/99448 | 12/2001 |

* cited by examiner

METHOD FOR PROVIDING PAYING
SERVICES, USER IDENTIFICATION DEVICE,
AND DEVICE FOR PROVIDING SAID
SERVICES

BACKGROUND OF THE INVENTION

It is known in radio communication systems, such as a system operating in accordance with the "Global System Mobile" (GSM) standard, to provide, over and above providing radio coverage for implementing radio links that incur a charge, extra paying services, such as the sending of text messages, structured in accordance with the "Short Message Service" (SMS) standard, for example.

There are basically two payment options in radio communication systems. In the first payment option, a network operator has access to a bank account of the user of the services, so that, in principle, the user can make use of the services within the network as long as it is possible to debit this account. In the second option, also known as "prepaid charging"," the user can secure a credit account with the operator by advancing the relevant amount of credit, so that he/she can use the full range of extra paying services cited above, or a subset of them, provided their costs are covered by the credit.

Thus, particularly in the latter payment option, a credit check generally needs to be made for providing a paying service.

A version of this is known from WO01/22761, in which a user initiates the paying service of sending an SMS by sending off the SMS concerned. Before the sent SMS is forwarded to its destination (message recipient), an entity responsible for this checks whether there is sufficient credit available. Depending on the result, the SMS is then passed to the recipient or terminated in the entity.

Another version is known from WO00/04701. In the system disclosed, SMS messages need to be exchanged to clarify the credit for providing a paying service.

A disadvantage with these methods is that, in the radio communication systems concerned, large amounts of data are sent, which results in a disproportionate load on the network resources particularly in the negative case; i.e., provision of a required service is denied because of insufficient credit to cover this.

A particular disadvantage here is the loading of the valuable air interface in the negative case by the transmission of large amounts of (user) data.

The invention thus seeks to enable paying services within a radio communication system, in particular a third generation radio communication system, to be provided in a way that conserves resources.

SUMMARY OF THE INVENTION

In the method according to the present invention for providing paying services within a radio communication network operating, in particular, in accordance with the "Global System Mobile" GSM standard or the "Universal Mobile Telecommunications System" UMTS standard, via at least one radio communication terminal including a device for user identification, particularly a "Subscriber Identity Module" SIM or "UMTS Subscriber Identity Module" USIM, and via at least one network control unit and at least one device for providing at least one service, when a request for one of the services is made by the radio communication terminal, at least one message generated by the user identification device is transmitted to the network control unit or device for providing the services.

The method according to the present invention achieves independence from network operators within a radio communication system because a standardized entity is employed that is used essentially by all network operators for user identification. Another characteristic of such user identification devices is that all communication terminals used in the radio communication systems concerned are designed to take a standardized user identification device, such as the SIM or USIM, and communicate with it so that both existing and future radio communication terminals can provide paying services according to the present invention without being modified.

In an advantageous embodiment, upon receipt of the message, the device for providing the services initiates a check of the account status assigned to the user identification device, with the provision of the service being enabled if the result of the check is positive, and the provision of the service being blocked if the result of the check is negative. This achieves the result that a minimum number of messages need to be sent over the respective radio communication system for provision of a paying service. In particular, the check of the account status can be made by the actual device for providing the service or by another entity (network control unit) as a result of a query by the device for providing the service.

If the message is formulated as a command of a command set implemented in the user identification device, in particular as specified in a "SIM Application "Toolkit" (SAT), or a "USIM Application "Toolkit" (USAT), or a "Card Application Toolkit" (CAT), this guarantees simple implementation of the method according to the present invention, because to request the paying service, merely this command, at least as part of the message, needs to be transmitted.

Devices for providing the services, particularly in a client/server based system, generally serve a number of terminals, so that, for a unique assignment, the message advantageously contains a first item of information identifying the radio communication terminal.

In order for the device for providing the services to be able to make a unique assignment describing which credit query is assigned to the service being requested, the message additionally and/or alternatively contains a second item of information identifying the current service request.

If the message contains an item of information describing the order of the services requested by the radio communication terminal, batch processing can be implemented, for example, in which the services are processed in order of the request, for instance. This order need not necessarily be the request order, however, but instead it is also possible, for example, for the radio communication terminal to make a prioritization, which is described by the item of information.

If the transfer of mobile e-mails, "instant messaging"," video telephony, a Multimedia Messaging Service and/or (Enhanced) Short Message Service are provided as paying services, and in this case the service request message $N_{DA}$ contains, depending on the type of the requested service, additional data required for providing the service, the minimization of data required for providing the service is advantageously supported, because information required to identify the respective service, for example, is already transmitted with the message. In the same way, parameters necessary for implementation of the services already may be transmitted with the message. Thus, back at the time of receiving the message, the device for providing the service becomes able to provide the service immediately after a positive result to the account-status query, if applicable, taking particular account of the parameters contained in the message.

The user identification device according to the present invention includes at least parts for generating a message addressed to a device for providing a paying service.

The device according to the present invention for providing the services includes a network control unit having parts for evaluating at least one service request message generated by the user identification device during the request for one of the services made by the radio communication terminal, in addition to parts for initiating the service and parts for providing the service.

Additional features and advantages of the present invention are described in, and will be apparent from, the following Detailed Description of the Invention and the Figures.

DETAILED DESCRIPTION OF THE INVENTION

Figure 1:
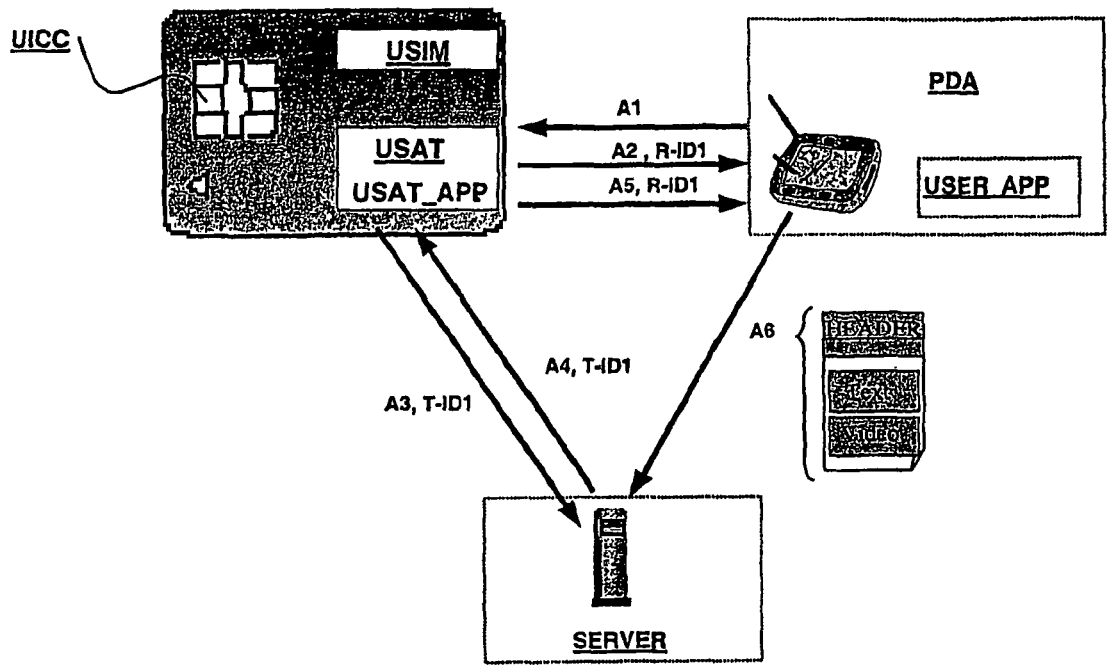
FIG. 1 shows a schematic diagram of the message flow when sending an MM (Multimedia Message; message with multimedia content) in accordance with the "Multimedia Messaging Service" standard (MMS).

FIG. 1 shows schematically a message transfer A1 ... A6, which is necessary for the method according to the present invention as part of the provision of a paying service, where an arrangement such as that in a third-generation radio communication system configured in accordance with the "Universal Mobile Telecommunications Standard" (UMTS) has been selected as the arrangement scenario for this exemplary embodiment. However, while it is preferred to use the method according to the present invention in this arrangement, its use is not restricted to this.

In the arrangement scenario of a UMTS system selected here, radio communication terminals can be operated solely using a user identification device USIM, where the radio communication terminal shown is embodied as a "Personal Digital Assistant" (PDA).

In the user identification device USIM, which in the UMTS arrangement scenario is embodied as a "Universal Integrated Circuit Chipcard" (UICC), at least one first application USAT_APP is implemented, which, using a command set that can be interpreted or executed by the user identification device, provides the functionality of a user identification device, where a "USIM" Application Toolkit command set is used as the command set, to which an additional command "CHECK PREPAID CREDIT" (name to be treated as exemplary not restrictive) has been added according to the present invention.

A device for providing paying services is embodied, according to the exemplary embodiment shown, as a station SERVER providing a server functionality. The station SERVER, in the scenario shown, has at least the function of transferring to a recipient multimedia messages (MMs) sent by the radio communication terminal PDA and formulated in accordance with the "Multimedia Messaging Service" standard, and/or sending out multimedia content on request.

The message flow A1 ... A6 will now be described below. Such a message flow A1 ... A6 is generally initiated by a user of the radio communication terminal. This happens, for example, by the user composing and wishing to send a multimedia message (MM) containing multimedia objects such as images, films and/or audio signals. Since the exemplary embodiment involves a user who is meant to pay via "prepaid charging"," a request is first sent by a second application USER_APP, assigned to the radio communication terminal PDA of the user, to the first application USAT_APP, which is recognized in the user identification device USIM and implements the method according to the present invention, via a first message A1 typically formulated as a command. After reception of the first message A1, a response A2 is sent to the second application USER_APP by the first application USAT_APP as a second message, the response A2 containing a request identifier R-ID1.

Approximately the same time as the response A2, a third message (service request message) A3 is transmitted to the station SERVER from the first application USAT_APP. This third message contains a transaction identifier T-ID1.

The request identifier R-ID1 and transaction identifier T-ID1 enable a credit check for the current request for providing the paying service to be assigned to the transmission of a multimedia message MM.

In addition to the transaction identifier T-ID1, the third message A3 contains primarily a request for the service addressed to the station SERVER, this request being formulated as a command of the USAT command set. This new command to be defined could be named "PREPAID CREDIT CHECK," for example.

An advantage of the formulation as a command is that commands can be encoded using few bits, in the ideal case even just by setting exactly one specific value, so that little capacity is required to transmit them. Another advantage is that a station SERVER, as used in the UMTS scenario, also has implemented the USAT command set, so that no other implementations need to be made for such requests.

In general, another entity will be queried about the credit by the station SERVER after reception of the third message A3. Alternatively, it also would be possible for this to take place in the station SERVER itself.

In order to enable differentiated payment, for instance because there are different types of paying services, or one service can have different characteristics (i.e., different parameters), it is provided alternatively or additionally to add further information to the third message A3 that enables an adjusted payment, where the first application USAT_APP receives this information from the second application USER_APP preferably via the first message A1 and/or retrieves this information itself.

After reception of the result, a fourth message A4 is sent from the station SERVER to the first application USAT_APP, the fourth message A4 containing the result of the check, and the transaction identifier T-ID1. The result of the check can be indicated as text (string) in the form "credit OK"," or in the negative case "credit low"," for example, or by straightforward setting of a defined bit of the fourth message A4.

Alternatively or additionally, more than just two decision levels also are possible, which can be used to inform the user of the need to increase the credit with "credit OK, re-charge recommendation"," for example, if the credit is only sufficient for the one service requested.

The first application USAT_APP evaluates the check result and sends to the second application USER_APP an evaluation-dependent fifth message A5 with which the first application indicates whether or not sufficient credit is available, where alternatively or additionally more than two decision levels are also possible at this point, and thus indicates whether or not the request to transmit a multimedia message MM can be met. In addition to this information, the fifth message A5 also contains the request identifier R-ID1, so that the second application USER_APP can assign this message to the correct request should there be further requests.

If sufficient credit is available, the multimedia message MM is transmitted as the sixth message A6 to the station SERVER.

If there is insufficient credit available, the sixth message A6 is not sent by the second application USER_APP.

Alternatively it also would be possible that, if there is insufficient credit, the fourth message A4 and fifth message A5 are not transmitted, and the second application USER_APP discards the request, for example after a timer has timed out. As such, the second application USER_APP only then sends off the sixth message if the positive indication is made actively by the station SERVER via the fourth message A4 and then by the sending of the fifth message A5.

Figure 2:
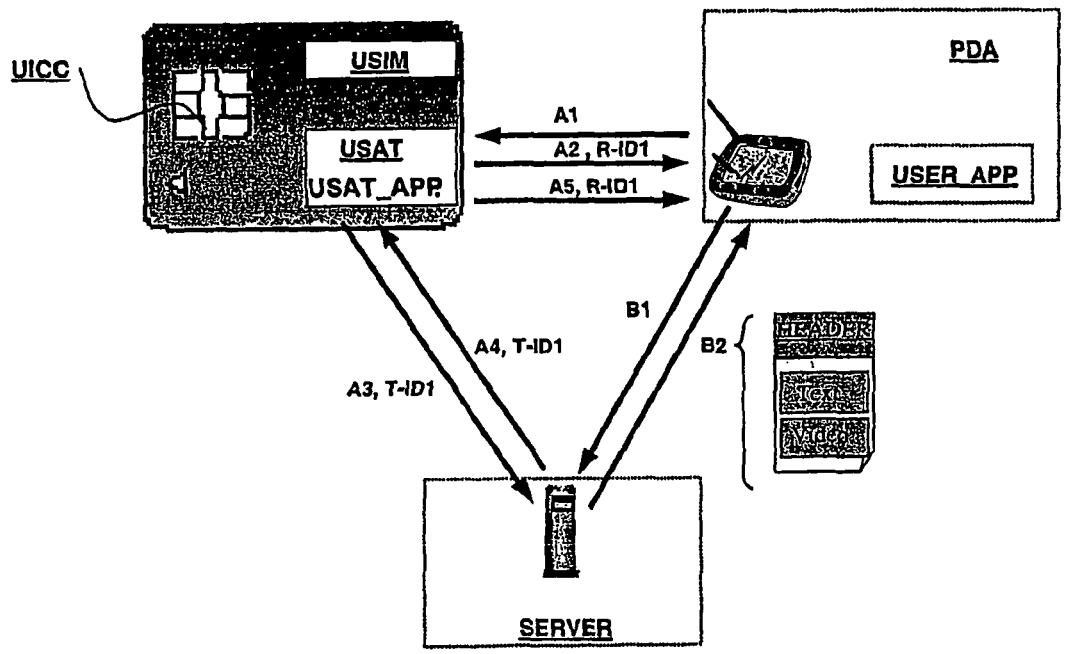
FIG. 2 shows a schematic diagram of the message flow when retrieving an MM from a server.

FIG. 2 shows a message flow A1 . . . A5, B1 . . . B2 based on the same UMTS arrangement scenario, where elements identical to the above example are labeled with the same reference symbols.

Unlike the process described above, the station SERVER here as a source of multimedia content which can be retrieved by the radio communication terminal PDA.

The associated message flow A1 . . . A5, B1 . . . B2 only differs from the previous exemplary embodiment in that, as a response to the sending of the fifth message A5, in the case of a positive indication (i.e., sufficient credit) a retrieval message B1 is sent by the second application USER_APP directly to the station SERVER, the station SERVER sending the retrieved multimedia content B2 to the second application USER_APP immediately upon receipt of this retrieval message B1.

Although the present invention has been described with reference to specific embodiments, those of skill in the art will recognize that changes may be made thereto without departing from the spirit and scope of the present invention as set forth in the hereafter appended claims.

The invention claimed is:

1. A method for providing pre-paid services over a radio communication network to a telecommunication device comprising a user identification circuit, the method comprising the steps of:
    receiving at the user identification circuit at least one service request generated by the telecommunication device;
    for each service request received from the telecommunication device, communicating a user identification message from the user identification circuit to the telecommunication device, each user identification message corresponding to each particular service request including a service identifier that identifies that particular service request;
    transmitting at least one service request message over the radio communication network from the user identification circuit to a service computer, wherein the at least one service request message requests allocation of at least one service;
    receiving a pre-paid account status message over the radio communication network from the service computer to the user identification circuit in response to each service request message, wherein the user identification circuit evaluates the pre-paid account status message; and
    for each evaluated pre-paid account status message received at the user identification circuit, communicating an account status result message from the user identification circuit to the telecommunication device to allocate use of the corresponding requested service when the evaluated pre-paid account status message indicates a specific result, each account status result message including the service identifier that identifies the particular service request corresponding to that account status result message such that the telecommunication device can match the account status result message with the user identification message that included the same service identifier.

2. The method according to claim 1, wherein the telecommunication device is one of a GSM device and a UMTS device.

3. The method according to claim 1, wherein the user identification circuit is one of a Subscriber Identity Module (SIM) and a UMTS Subscriber Identity Module (USIM).

4. The method according to claim 3, wherein the service request message is generated by a command set on an application toolkit stored in one of the Subscriber Identity Module (SIM) and a UMTS Subscriber Identity Module (USIM).

5. The method according to claim 1, wherein the at least one service request message is transmitted concurrently with the communication of the user identification message.

6. The method according to claim 1, wherein the specific result is an indication that sufficient pre-paid credit is available.

7. The method according to claim 1, wherein the service is at least one of mobile email, instant messaging, video telephony, a multimedia messaging service and a short message service.

8. The method according to claim 1, wherein and the at least one service request message contains, depending upon a type of requested service, additional data required for providing the service.

9. The method according to claim 8, wherein each service request message includes parameters for charges, depending on the type of service being requested.

10. The method according to claim 8, wherein the at least one service request message describes an order of the services requested by the radio communication terminal.

11. The method according to claim 1, further comprising the step of blocking allocation of the requested service if the evaluated pre-paid account status message does not indicate the specific result.

12. The method according to claim 1, wherein the service computer is a server.

13. An apparatus that allocates pre-paid services over a radio communication network, comprising:
    a telecommunication device that sends at least one service request to the over identification circuit; and
    a user identification circuit, wherein the user identification circuit:
        communicates, for each service request received from the telecommunication device, a user identification message to the telecommunication device, each user identification message corresponding to each particular service request including a service identifier that identifies that particular service request, and
        transmits at least one service request message over the radio communication network to a service computer, wherein the at least one service request message requests allocation of at least one service,
        receives a pre-paid account status message over the radio communication network from the service computer to the user identification circuit in response to each service request message, wherein the user identification circuit evaluates the pre-paid account status message, and
        for each evaluated pre-paid account status message received at the user identification circuit, communicates an account status result message to the telecommunication device to allocate use of the corresponding requested service when the evaluated pre-paid account status message indicates a specific result, each account status result message including the service identifier that identifies the particular service request corresponding to that account status result message such that the telecommunication device can match the account status result message with the user identification message that included the same service identifier.

14. The apparatus according to claim 13, wherein the telecommunication device is one of a GSM device and a UMTS device.

15. The apparatus according to claim 13, wherein the user identification circuit is one of a Subscriber Identity Module (SIM) and a UMTS Subscriber Identity Module (USIM).

16. The apparatus according to claim 13, wherein the service request message is generated by a command set on an application toolkit stored in one of the Subscriber Identity Module (SIM) and a UMTS Subscriber Identity Module (USIM).

* * * * *